(12) United States Patent
Lu

(10) Patent No.: US 7,808,868 B2
(45) Date of Patent: Oct. 5, 2010

(54) METHOD FOR DETERMINING DISK TYPE

(75) Inventor: Kuo-Ping Lu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 427 days.

(21) Appl. No.: 12/023,040

(22) Filed: Jan. 31, 2008

(65) Prior Publication Data

US 2008/0192604 A1   Aug. 14, 2008

(30) Foreign Application Priority Data

Feb. 14, 2007   (TW) .............................. 96105462 A

(51) Int. Cl.
   *G11B 7/00* (2006.01)
(52) U.S. Cl. ................. 369/53.22; 369/44.25
(58) Field of Classification Search ................. 369/53.22
   See application file for complete search history.

(56) References Cited

U.S. PATENT DOCUMENTS

| | | | |
|---|---|---|---|
| 5,587,981 A | 12/1996 | Kamatani | |
| 6,044,048 A * | 3/2000 | Oinoue et al. | 369/44.23 |
| 2006/0007812 A1* | 1/2006 | Nishi et al. | 369/44.37 |
| 2006/0018214 A1* | 1/2006 | Fujii et al. | 369/44.37 |
| 2006/0164954 A1* | 7/2006 | Hashimura | 369/112.01 |

* cited by examiner

*Primary Examiner*—Van N Chow
(74) *Attorney, Agent, or Firm*—Jianq Chyun IP Office

(57) ABSTRACT

A method for determining a disk type is provided. In the invention, a pickup head of a DVD optical drive is moved to a blank area of the disk where no data is stored. After rotation of the disk is stopped, the blank area is irradiated with a laser beam, and reflective signals reflected from a surface layer and a reflective layer of the disk are measured respectively. According to a time difference between the two reflective signals, the type of the disk placed in the DVD optical drive is determined. Therefore misjudgment because of effects of pits in a data area of the disk on the reflective signals can be avoided, so that the disk type can be accurately determined.

10 Claims, 3 Drawing Sheets

METHOD FOR DETERMINING DISK TYPE

CROSS-REFERENCE TO RELATED APPLICATION

This application claims the priority benefit of Taiwan application serial no. 96105462, filed on Feb. 14, 2007. The entirety of the above-mentioned patent application is hereby incorporated by reference herein and made a part of this specification.

BACKGROUND OF THE INVENTION

1. Field of the Invention

The invention relates to a method for determining the type of a disk and, more particularly, to a method for determining the type of a disk in a blank area with no data of the disk.

2. Description of the Related Art

As the information age comes, to deal with large mount of digital information with different formats, optical storage mediums with the advantages of large storage capacity, fast accessing speed, easily to be carried, and convenient to be stored, are becoming a necessary means for storing data.

Digital versatile disks (DVD), a new kind of medium for storing optical information, are superior to compact disks (CD) in data density and the capacity. Therefore, DVD optical drives gradually replace conventional optical drives and become the mainstream products. However, since a lot of data are stored in the CDs in the past, the DVD optical drives have to be capable of reading the CDs. Furthermore, due to different use and different supporting companies, the DVDs can be divided into different specifications such as DVD-ROM, DVD-R, DVD-RW, DVD-RAM, DVD+R, and DVD+RW, while the CDs can also be divided into CD-ROM, CD-R, and CD-RW. Therefore when designing the DVD optical drives, compatibility needs to be considered to satisfy users' needs.

Although the same pickup head is used for reading the CDs and the DVDs in the DVD optical drives, many structural differences exist between the two kinds of disks. FIG. 1 is a vertical cross-sectional view of a CD. Please referring to FIG. 1, a CD 100 has a thickness of about 1.2 mm, and has a recording layer 120, a reflective layer 130, and a printing layer 140 formed in order on a surface of a pre-grooved substrate 110. FIG. 2 is a vertical cross-sectional view of a DVD. Please referring to FIG. 2, a DVD 200 includes a dummy substrate 250 with a thickness of 0.6 mm, and a data substrate with a thickness of 0.6 mm. The two substrates are adhered to each other by an adhering layer 240 to form an optical disk with a thickness of 1.2 mm. The data substrate has a pre-grooved substrate 210 as a base, and a recording layer 220 and a reflective layer 230 are formed thereon in order.

Because the structure of the two optical disks is different, a pickup head of the optical drive must emit laser beams of different power levels, and read data using different methods. Therefore before reading data, the optical drive must determine the disk type and employ a suitable reading method to correctly read data recorded thereon.

In a conventional method, determining the type of a disk placed in an optical drive is achieved by calculating the reflection time of the laser beam. First, the laser beam is emitted from a pickup head onto a data area of a disk. When the laser beam reaches the surface of the disk, it produces a reflective signal (note that many pits are formed on the surface of a reflective layer); while when the laser beam reaches the reflective layer of the disk, it also produces a reflective signal. A time difference between the two reflective signals is compared with a predetermined critical value to determine the disk type. As shown in FIG. 1 and FIG. 2, the substrate 110 of the CD 100 is thicker than the substrate 210 of the DVD 200, and therefore when the laser beam irradiates the CD 100, the time difference of the reflective signals is larger than that of the DVD 200. The optical drive therefore can determine whether the disk is a CD or a DVD.

However, in the conventional method for determining a disk type, the laser beam irradiates the data area of the disk where data is stored, while the pits formed by burning or etching are formed on the substrate of the disk in the data area. The pits make the reflected light scatter or diffract, and a depth difference between a land area and a pit area on the disk makes the time difference of the reflective signals produce errors. Therefore, the optical drive may misdetermine the disk type because of the errors to fail to read data stored in the disk correctly.

BRIEF SUMMARY OF THE INVENTION

Therefore, an objective of the invention is to provide a method for determining a disk type by moving a pickup head to a blank area with no data, so that misdetermining the disk type due to the depth of the pits can be avoided.

To achieve the above and other objectives, the invention provides a method for determining a disk type of a digital versatile disk (DVD) optical drive. The DVD optical drive includes a pickup head, a spindle motor, and a stepping motor, and is suitable for accommodating a disk. The method for determining a disk type includes the following steps. First, the pickup head is moved to a blank area of the disk where no data is stored. After rotation of the disk is stopped, the blank area is irradiated with a laser beam in a first wavelength, and a first time interval for the laser beam to reflect from a surface of the blank area to the pickup head, and a second time interval for the laser beam to reflect from a reflective layer of the blank area to the pickup head, are both measured. A time difference between the first time interval and the second time interval is calculated, and then the time difference is compared with a reference value to determine the disk type.

In a preferred embodiment, before the step of moving the pickup head to the blank area of the disk where no data is stored, the spindle motor may be rotated for a first time period to determine whether the disk is placed properly.

According to a preferred embodiment of the invention, the step of moving the pickup head to the blank area of the disk where no data is stored may further include the following steps. The pickup head is moved in a direction toward the center of the disk until the pickup head reaches a dead position. Then, the disk is rotated at a first speed, and the pickup head is turned on to irradiate the disk with the laser beam. Tracking is performed to move the pickup head along a track at a second speed toward a direction away from the center. A high-frequency reflective signal reflected from the disk is received and processed to determine whether the reflective signal is at a high level or a low level. A first time point when the low level initially occurs is calculated; then after over a third time interval from the first time point, the moving of the pickup head is stopped; and the pickup head is moved at the second speed in the direction toward the center over a fourth time interval which is longer than the third time interval.

In a preferred embodiment, the step of determining whether the high-frequency reflective signal is at the high level or the low level may further include the high-frequency reflective signal being at the high level when a land area is irradiated with the laser beam and the high-frequency reflective signal being at the low level when a pit area is irradiated with the laser beam.

In a preferred embodiment, the dead position may be the position closest to the center of the disk that the pickup head can reach.

In a preferred embodiment, the step of tracking to move the pickup head along the track at the second speed toward the direction away from the center may further include: using a spectroscope to divide the laser beam so that a primary spot and two secondary spots appear when the laser beam irradiates the disk. A plurality of reflected light of the spots may be received by photo detectors of the pickup head to advance or retreat the primary spot along a predetermined track of the disk according to the amount of reflection of the reflected light.

In a preferred embodiment, the step of determining whether the high-frequency reflective signal is at the high level or the low level may further include comparing the amount of the reflection of the reflected light with a default value. If the amount of the reflection is larger than the default value, the high-frequency reflective signal is at the high level; if the amount of the reflection is smaller than the default value, the high-frequency reflective signal is at the low level.

In a preferred embodiment, the step of stopping moving the pickup head after over the third time interval from the first time point may further include according to a clock signal produced by a clock circuit wherein the clock signal includes a plurality of the same pulse unit, comparing the high-frequency reflective signal with the clock signal to calculate relationship between the third time interval and the pulse unit.

In a preferred embodiment, the step of moving the pickup head at the second speed in the direction toward the center over the fourth time interval longer than the third time interval may further include continuously accumulating the same pulse unit to be equal to the fourth time interval according to a clock signal produced by a clock circuit.

In a preferred embodiment, a testing area may be closest to the center and a data area may be in an outer periphery of the testing area. A program memory area (PMA) may be in a peripheral area of the testing area, and the blank area may be in an inner periphery of the PMA. A track may extend from the testing area to the data area along a spiral curve.

In this invention, first, the pickup head is moved to the blank area of the disk where no data is stored; then the surface and the reflective layer of the blank area are irradiated with the laser beam, and the difference in the reflection time of the laser beam is calculated to determine the disk type. Therefore, misdetermining the disk type because of effects of the pits in the data area on the reflection of the laser beam can be reduced.

In the method for determining a disk type according to the invention, the pickup head of the DVD optical drive is moved to the blank area of the disk where no data is stored, and the time for the laser beam to reflect to the surface layer and the reflective layer of the blank area is calculated respectively to determine the type of the disk placed in the DVD optical drive. Therefore misdetermining the disk type to fail to read disk data because of the effects of the pits in the data area of the disk on the reflective signals can be avoided.

These and other features, aspects, and advantages of the present invention will become better understood with regard to the following description, appended claims, and accompanying drawings.

DETAILED DESCRIPTION OF THE EMBODIMENTS

When a disk type is determined according to reflection time by irradiating a disk with a laser beam, if an area where data is stored is irradiated with the laser beam, the reflection time may be affected by pits in the disk, which results in the misjudgment of the disk type. To avoid this, in this invention, a pickup head is moved to a blank area of the disk where no data is stored to determine the disk type. Misjudgment therefore can be avoided effectively.

Figure 1:
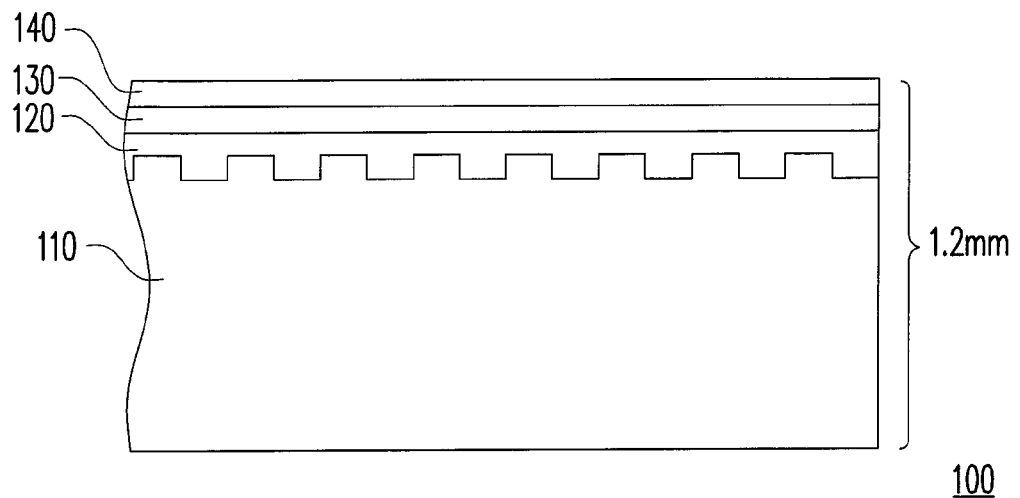
FIG. 1 is a vertical cross-sectional view of parts of a data area of a compact disk (CD).
Figure 2:
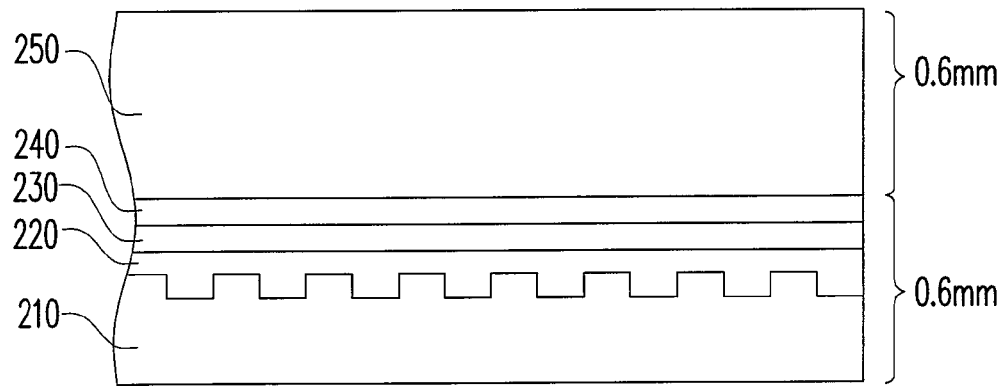
FIG. 2 is a vertical cross-sectional view of parts of a data area of a digital versatile disk (DVD).
Figure 3:
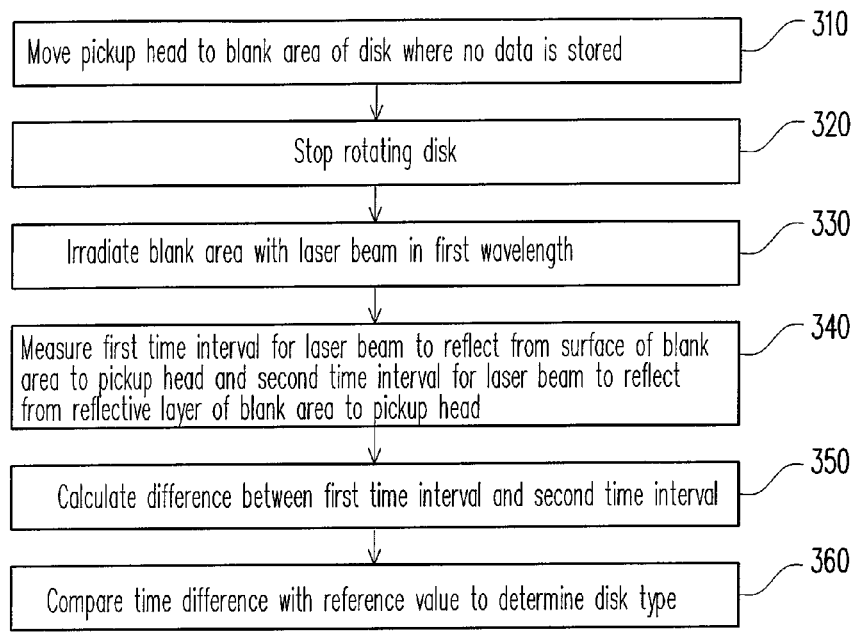
FIG. 3 is a flow chart showing a method for determining a disk type according to a preferred embodiment of the invention.

FIG. 3 is a flow chart showing a method for determining a disk type according to a preferred embodiment of the invention. This embodiment takes a digital versatile disk (DVD) optical drive suitable for accommodating a disk as an example to explain detailed steps for determining the disk type. The DVD optical drive includes a pickup head, a spindle motor, a stepping motor, and so on. By this method, the DVD optical drive can determine whether the disk placed therein is a compact disk (CD) or a DVD.

Before the judgment on the disk type, whether the disk is properly placed in the DVD optical drive should be determined by rotating the spindle motor in the DVD optical drive for some time (such as two seconds). Then the pickup head of the DVD optical drive is moved to a blank area of the disk where no data is stored (step 310).

Figure 4:
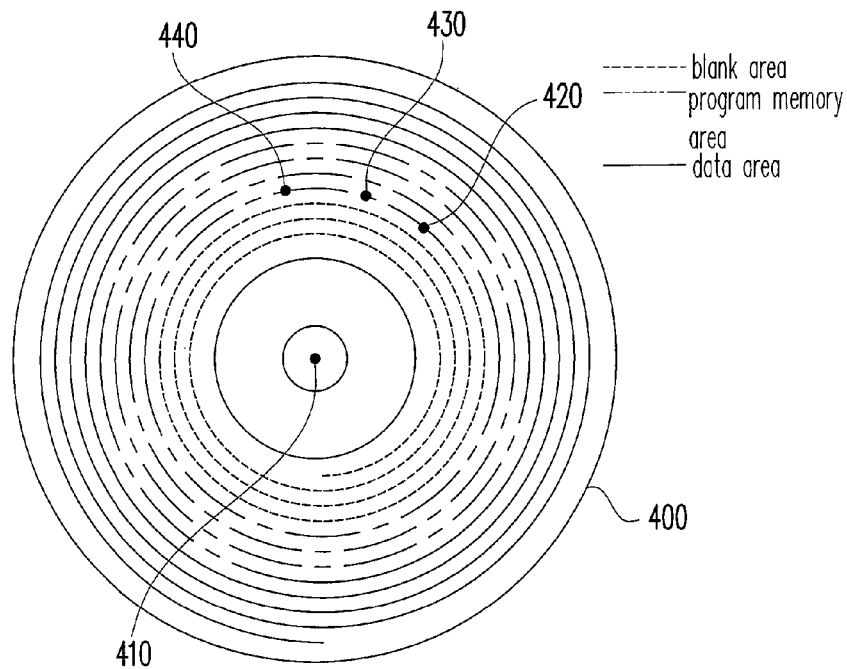
FIG. 4 is a horizontal cross-sectional view of a disk.

FIG. 4 is a horizontal cross-sectional view of a disk. Please referring to FIG. 4, a disk 400 includes a blank area, a program memory area (PMA), and a data area, while combination of the blank area and the PMA is called a testing area. The blank area is closest to a center 410 and is suitable for receiving laser beams for trial writing when power calibration is performed; the PMA is in an outer periphery of the blank area and is mainly for recording a table of content (TOC) of the disk; the data area is in the most outer periphery and is for recording data that a user wants to store on the disk. In this embodiment, the pickup head is moved to the blank area, and in order to clearly explain the detailed steps of moving the pickup head to the blank area, another embodiment is provided for further explanation.

Figure 5:
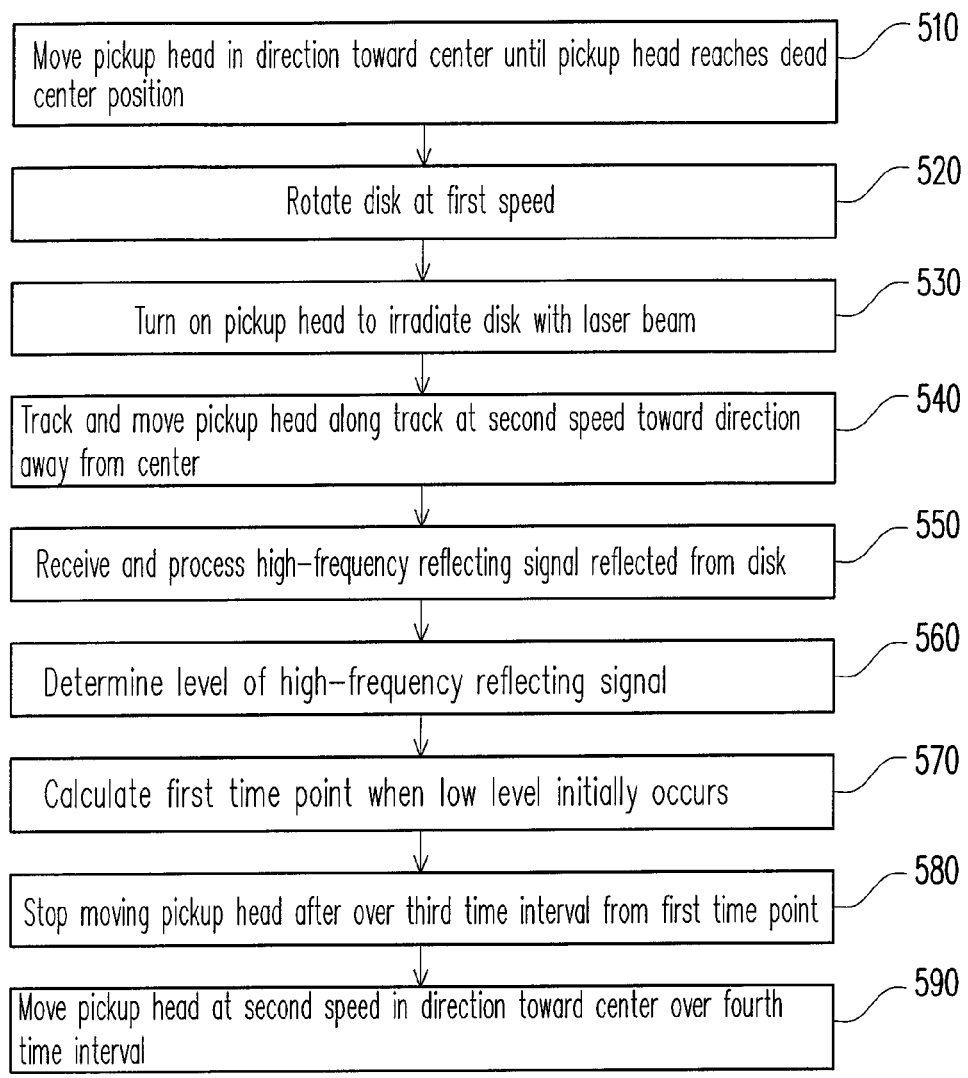
FIG. 5 is a flow chart showing moving a pickup head to a blank area of a disk according to a preferred embodiment.

FIG. 5 is a flow chart showing moving a pickup head to a blank area of a disk according to a preferred embodiment. Please referring to FIG. 4 and FIG. 5 together, first, in step 510, the pickup head is moved in a direction toward the center 410 of the disk 400 until the pickup head reaches a dead position. In this embodiment, the dead position may be the position closest to the center 410 of the disk 400 that the pickup head driven by the stepping motor can reach.

Second, the disk 400 is rotated at a first speed (step 520). The pickup head is turned on to irradiate the disk 400 with the laser beam (step 530). Then in step 540, the stepping motor drives the pickup head to track to move the pickup head along a track of the disk 400 at a second speed toward a direction away from the center 410. The track of the disk 400 extends from the testing area to the data area along a spiral curve, and the first speed and the second speed are both uniform speeds.

In this embodiment, tracking is to assure that the emitted laser beam can follow the track of the disk 400 accurately when the pickup head moves. Tracking employs conventional techniques in the art, such as the three-beam method. In the three-beam method, a spectroscope is used to divide the laser beam irradiating the disk 400 into a primary spot and two secondary spots; reflected light of the spots is received by photo detectors of the pickup head; the primary spot is made advance or retreat along the track of the disk 400 according to the amount of the reflections of the two secondary spots and calculation results thereof.

Figure 6:
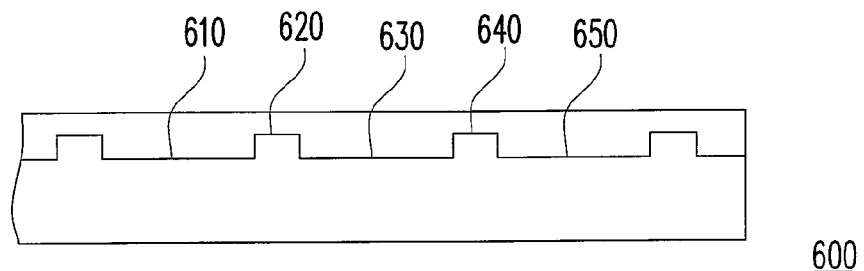
FIG. 6 is a vertical cross-sectional view of parts of a program memory area (PMA).

Please returning to FIG. 4, next the DVD optical drive receives and processes the high-frequency reflective signals reflected from the disk 400 (step 550), and then determines the level of the high-frequency reflective signal (step 560). Generally speaking, the levels of the high-frequency reflective signals are related to the areas irradiated by the laser beam. FIG. 6 is a vertical cross-sectional view of parts of a PMA. Please referring to FIG. 6, the PMA 600 includes a land area 610, a land area 630, a land area 650, a pit area 620, and a pit area 640. When the laser beam irradiates the land areas of the PMA 600 (such as the land area 610), the high-frequency reflective signal after reflection is strong, and therefore the high-frequency reflective signal is at the high level; on the other hand, if the laser beam irradiates the pit areas of the PMA 600 (such as the pit area 620), the high-frequency reflective signal after reflection is weak, and therefore the high-frequency reflective signal is at the low level.

In another embodiment, the amount of the reflection of the reflected light is compared with a default value. If the amount of the reflection is larger than the default value, the high-frequency reflective signal is at the high level; if the amount of the reflection is smaller than the default value, the high-frequency reflective signal is at the low level. The default value can be pre-recorded in Read Only Memory (ROM) of the DVD optical drive.

Next, the time point when the high-frequency reflective signal is at the low level for the first time is calculated (step 570). In the embodiment, the time point when the high-frequency reflective signal is at the low level for the first time is when the pickup head moves to a first pit area 420 of the innermost periphery of the disk 400. To explain conveniently, this time point is referred to as a first time point.

Next step is moving the pickup head from the first time point for a third time interval (step 580). In the embodiment, the method for calculating the third time interval includes using a clock signal produced by a clock circuit, wherein the clock signal includes a plurality of the same pulse unit. Then the high-frequency reflective signal is compared with the clock signal to calculate relationship between the third time interval and the pulse unit (that is, how much pulse unit the third time interval is equal to). In the embodiment, the moving speed of the pickup head (the second speed) is a uniform speed. Therefore if only the time period until the pickup head stops from the first time point is calculated (that is, the number of the passed pulse unit), the total distances the pickup head moves can be calculated.

Finally, the pickup head is driven by the stepping motor to move at the second speed in the direction toward the center 410. After over a fourth time interval, the moving of the pickup head is stopped (step 590). The embodiment also includes: according to a clock signal produced by a clock circuit, continuously accumulating pulse unit when the pickup head is moved, and then stopping moving the pickup head until the amount of the pulse unit is equal to the fourth time interval. In the embodiment, the fourth time interval is longer than the third time interval to assure that the pickup head is moved out of the data area of the disk. The fourth time interval should be one to five seconds longer than the third time interval and can be adjusted according to the form of the stepping motor. That is, the pickup head may stop on the blank area of the disk 400 where no data is stored to avoid interference from the pits of the data area. In another embodiment, according to known parameters, output signals of the stepping motor can be measured. Also, a first number of rotating until the stepping motor stops rotating from the first time point can be calculated. Then the stepping motor is ordered to rotate round for a second number of rotating larger than the first number of rotating to assure that the pickup head can stop on the blank area of the disk 400 where no data is stored.

Please returning to FIG. 3, after the pickup head is moved to the blank area of the disk, the spindle motor stops rotating the disk (step 320) and the laser beam in a first wavelength irradiates the blank area (step 330).

Next, a first time interval for the laser beam to reflect from a surface of the blank area to the pickup head and a second time interval for the laser beam to reflect from a reflective layer of the blank to the pickup head area are measured (step 340); a time difference between the first time interval and the second time interval is calculated (step 350); then the time difference is compared with a reference value to determine the disk type (step 360), wherein the reference value can be pre-recorded in memory of the DVD optical drive.

According to the disk structure of the CD and the DVD, when the laser beam irradiates the blank area of the CD, a difference between the first time interval for the reflection of the surface and the second time interval for the reflection of the reflective layer is longer than that of the DVD. Therefore, whether the disk in the DVD optical drive is a CD or a DVD can be determined by comparing the difference with a reference value.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A method for determining a disk type and is suitable for a digital versatile disk (DVD) optical drive, wherein the DVD optical drive comprising a pickup head, a spindle motor, and a stepping motor, and a disk suitable for accommodating in the device, the method comprising:
   (a). moving the pickup head to a blank area with no data of the disk, and rotating the disk;
   (b). stopping the rotating disk;
   (c). irradiating the blank area with a laser beam in a first wavelength;
   (d). measuring the first time interval of the laser beam reflects from a surface of the blank area to the pickup head and a second time interval of the laser beam reflects from a reflective layer of the blank area to the pickup head;
   (e). calculating a time difference between the first time interval and the second time interval; and
   (f). comparing the time difference with a reference value to determine the disk type.

2. The method for determining a disk type according to claim 1, before the step (a), the method further comprises:
   rotating the spindle motor for a first time period to determine whether the disk is placed properly.

3. The method for determining a disk type according to claim 1, wherein the step (a) comprises:
   moving the pickup head in a direction toward the center of the disk until the pickup head reaches a dead position;
   rotating the disk in a first speed;
   turning on the pickup head to irradiate the disk with the laser beam;
   tracking and moving the pickup head along a track in a second speed toward a direction away from the center;
   receiving and processing a high-frequency reflective signal reflected from the disk;
   determining whether the high-frequency reflective signal is at a high level or a low level;
   calculating a first time point when the low level initially occurs;
   stopping moving the pickup head after over a third time interval from the first time point; and
   moving the pickup head at the second speed in the direction toward the center over a fourth time interval which is longer than the third time interval.

4. The method for determining a disk type according to claim 3, wherein the method for determining whether the high-frequency reflective signal is at the high level or the low level further comprises:
   the high-frequency reflective signal being at the high level when a land area is irradiated with the laser beam, and the high-frequency reflective signal being at the low level when a pit area is irradiated with the laser beam.

5. The method for determining a disk type according to claim 3, wherein the dead position locates at the most closest to the center of the disk that the pickup head can reach.

6. The method for determining a disk type according to claim 3, wherein the step of tracking and moving the pickup head along the track at the second speed toward the direction away from the center further comprises:
   using a spectroscope to divide the laser beam, so that a primary spot and two secondary spots appear when the laser beam irradiates the disk, a plurality of reflected light of the primary spot and the secondary spots is received by photo detectors of the pickup head, and keeping the primary spot to follow the predetermined track of disk.

7. The method for determining a disk type according to claim 6, wherein the step of determining whether the high-frequency reflective signal is at the high level or the low level further comprises:
   comparing the reflection amount of the reflected light with a default value, and determining that the high-frequency reflective signal is at the high level if the amount of the reflection is larger than the default value or at the low level if the amount of the reflection is smaller than the default value.

8. The method for determining a disk type according to claim 3, wherein the step of stopping moving the pickup head after over the third time interval from the first time point further comprises:
   according to a clock signal produced by a clock circuit, wherein the clock signal comprises a plurality of the same pulse unit, calculating relationship between the third time interval and the pulse unit by comparing the high-frequency reflective signal with the clock signal.

9. The method for determining a disk type according to claim 3, wherein the step of moving the pickup head at the second speed in the direction toward the center over the fourth time interval which is longer than the third time interval further comprises:
   according to a clock signal produced by a clock circuit, wherein the clock signal comprises a plurality of the same pulse unit, accumulating the pulse unit continuously until the amount of pulse unit is equal to the fourth time interval.

10. The method for determining a disk type according to claim 1, wherein a testing area of the disk is close to the center of the disk, a data area of the disk is in an outer periphery of the testing area, a program memory area (PMA) of the disk is in a peripheral area of the testing area, the blank area is in an inner periphery of the PMA, and a track of the disk extends from the testing area to the data area along a curve.

* * * * *